US011169453B2

(12) United States Patent
Takeuchi et al.

(10) Patent No.: US 11,169,453 B2
(45) Date of Patent: Nov. 9, 2021

(54) ELECTROPHOTOGRAPHIC PHOTOSENSITIVE MEMBER, PROCESS CARTRIDGE AND ELECTROPHOTOGRAPHIC APPARATUS

(71) Applicant: CANON KABUSHIKI KAISHA, Tokyo (JP)

(72) Inventors: Eileen Takeuchi, Tokyo (JP); Koichi Nakata, Tokyo (JP); Shubun Kujirai, Toride (JP); Haruki Mori, Nagareyama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/894,988

(22) Filed: Jun. 8, 2020

(65) Prior Publication Data

US 2020/0393772 A1    Dec. 17, 2020

(30) Foreign Application Priority Data

Jun. 13, 2019    (JP) .............................. JP2019-110644

(51) Int. Cl.
*G03G 5/147* (2006.01)
*G03G 5/043* (2006.01)
(Continued)

(52) U.S. Cl.
CPC .............. *G03G 5/043* (2013.01); *C08K 3/22* (2013.01); *C08K 9/04* (2013.01); *G03G 5/06142* (2020.05); *G03G 5/14704* (2013.01); *G03G 5/14786* (2013.01); *G03G 21/1814* (2013.01); *C08K 2003/2231* (2013.01);
(Continued)

(58) Field of Classification Search
CPC .............. G03G 5/147; G03G 5/14708; G03G 5/14713; G03G 5/14717; G03G 5/14786
See application file for complete search history.

(56) References Cited

U.S. PATENT DOCUMENTS 7,186,489 B2    3/2007   Uematsu et al.
7,226,711 B2    6/2007   Amamiya et al.
(Continued)

FOREIGN PATENT DOCUMENTS

JP    2000-206724    *  7/2000   ............. G03G 5/147
JP    2006-267856       10/2006
(Continued)

OTHER PUBLICATIONS

Translation of JP 2000-206724.*
(Continued)

*Primary Examiner* — Peter L Vajda
(74) *Attorney, Agent, or Firm* — Venable LLP

(57) ABSTRACT

The present disclosure provides an electrophotographic photosensitive member having a surface layer in which an occurrence of the image deletion is suppressed; a process cartridge equipped with the electrophotographic photosensitive member; and an electrophotographic apparatus provided with the process cartridge. An electrophotographic photosensitive member has a surface layer that includes a copolymerized product of a composition including a metal oxide particle having a polymerizable functional group on a surface thereof and a polymerizable compound having a particular structure.

7 Claims, 2 Drawing Sheets

(51) Int. Cl.
*C08K 3/22* (2006.01)
*C08K 9/04* (2006.01)
*G03G 21/18* (2006.01)
*G03G 5/06* (2006.01)

(52) U.S. Cl.
CPC ............ *C08K 2003/2237* (2013.01); *C08K 2003/2296* (2013.01); *G03G 2215/00957* (2013.01)

(56) References Cited

U.S. PATENT DOCUMENTS

| | | | |
|---|---|---|---|
| 7,534,534 | B2 | 5/2009 | Nakata et al. |
| 9,063,441 | B2 | 6/2015 | Yamanami et al. |
| 9,316,931 | B2 | 4/2016 | Takagi et al. |
| 9,389,523 | B2 | 7/2016 | Nakata et al. |
| 9,594,318 | B2 | 3/2017 | Nakata et al. |
| 9,740,117 | B2 | 8/2017 | Kosaka et al. |
| 10,042,272 | B2 | 8/2018 | Mori et al. |
| 10,120,331 | B2 | 11/2018 | Nakata et al. |
| 10,241,429 | B2 | 3/2019 | Shimada et al. |
| 10,310,395 | B2 | 6/2019 | Nakata et al. |
| 10,353,340 | B2 | 7/2019 | Kuroiwa et al. |
| 10,365,569 | B2 | 7/2019 | Tokimitsu et al. |
| 10,394,144 | B2 | 8/2019 | Sakimura et al. |
| 10,451,984 | B2 | 10/2019 | Mori et al. |
| 10,488,769 | B2 | 11/2019 | Nakata et al. |
| 10,488,770 | B2 | 11/2019 | Kuroiwa et al. |
| 10,488,771 | B2 | 11/2019 | Mori et al. |
| 10,558,132 | B2 | 2/2020 | Ishiduka et al. |
| 10,558,133 | B2 | 2/2020 | Nakamura et al. |
| 10,670,979 | B2 | 6/2020 | Nakata et al. |
| 10,705,440 | B2 | 7/2020 | Ueno et al. |
| 10,761,442 | B2 | 9/2020 | Nakata et al. |
| 10,768,539 | B2 | 9/2020 | Mori et al. |
| 2003/0190540 | A1* | 10/2003 | Shoshi ............ C07D 209/66 430/78 |
| 2014/0120463 | A1 | 5/2014 | Yamanami et al. |
| 2018/0024450 | A1* | 1/2018 | Ueda ............ G03G 5/062 430/58.35 |
| 2018/0314188 | A1 | 11/2018 | Takeuchi et al. |
| 2019/0094725 | A1 | 3/2019 | Sakimura et al. |
| 2019/0369514 | A1 | 12/2019 | Watanabe et al. |
| 2019/0391504 | A1* | 12/2019 | Nakata ............ G03G 5/0596 |
| 2020/0159136 | A1 | 5/2020 | Mori et al. |
| 2020/0201200 | A1 | 6/2020 | Tokimitsu et al. |
| 2020/0218171 | A1 | 7/2020 | Takeuchi et al. |
| 2020/0225595 | A1 | 7/2020 | Takeuchi et al. |
| 2020/0249590 | A1 | 8/2020 | Nakata et al. |

FOREIGN PATENT DOCUMENTS

| | | |
|---|---|---|
| JP | 2011-107363 | 6/2011 |
| JP | 2014-085564 | 5/2014 |
| JP | 2018-097278 | 6/2018 |
| JP | 2018-132722 | 8/2018 |
| JP | 2019-061003 | 4/2019 |

OTHER PUBLICATIONS

U.S. Appl. No. 16/855,022, Kenichi Ikari, filed Apr. 22, 2020.
U.S. Appl. No. 16/855,035, Ryoichi Tokimitsu, filed Apr. 22, 2020.
U.S. Appl. No. 16/894,977, Shubun Kujirai, filed Jun. 8, 2020.
U.S. Appl. No. 16/936,508, Takahiro Mitsui, filed Jul. 23, 2020.
U.S. Appl. No. 16/936,642, Mai Kaku, filed Jul. 23, 2020.
U.S. Appl. No. 17/082,610, Haruki Mori, filed Oct. 28, 2020.

* cited by examiner

ELECTROPHOTOGRAPHIC PHOTOSENSITIVE MEMBER, PROCESS CARTRIDGE AND ELECTROPHOTOGRAPHIC APPARATUS

BACKGROUND OF THE INVENTION

Field of the Invention

The present disclosure relates to an electrophotographic photosensitive member; and a process cartridge and an electrophotographic apparatus each having the electrophotographic photosensitive member.

Description of the Related Art

An electrophotographic photosensitive member that contains an organic photoconductive substance (charge generation substance) is widely used as an electrophotographic photosensitive member which is mounted on an electrophotographic apparatus. In recent years, for the purpose of prolonging the life of the electrophotographic photosensitive member and improving an image quality during repeated use, the electrophotographic photosensitive member is required to improve its mechanical durability (abrasion resistance).

As a technology for improving the abrasion resistance, there is a method of allowing a surface layer of an electrophotographic photosensitive member to contain a metal oxide particle. In Japanese Patent Application Laid-Open No. 2014-085564, a technology is described that improves the abrasion resistance by allowing the surface layer to contain two or more metal oxides having different primary particle sizes from each other. In addition, in Japanese Patent Application Laid-Open No. 2011-107363, a technology is described that improves the abrasion resistance by allowing the surface layer to contain a product which is obtained by reacting a metal oxide particle having a chain polymerizable functional group with a chain polymerizable compound.

However, in the electrophotographic photosensitive member of the prior art described above, many hydroxyl groups exist on the surface of the metal oxide particle, and accordingly, the hydrophilicity on the surface is high. Because of this, the electrophotographic photosensitive member in which the metal oxide particles are dispersed in the surface layer exhibits excellent abrasion resistance, but water tends to adhere to the surface layer. When water adheres to the surface layer and intrudes into the film, chemically deteriorated component tends to deposit on the surface. In such an electrophotographic photosensitive member having high abrasion resistance, there has been a problem that the level of the image defect (image deletion) becomes remarkably serious, because the deteriorated component on the surface is not easily removed by a cleaning unit.

Accordingly, an object of the present disclosure is to provide an electrophotographic photosensitive member having a surface layer in which an occurrence of the image deletion is suppressed.

In addition, another object of the present disclosure is to provide a process cartridge equipped with the electrophotographic photosensitive member, and an electrophotographic apparatus provided with the process cartridge.

SUMMARY OF THE INVENTION

The above object is achieved by the following present disclosure.

The present disclosure relates to an electrophotographic photosensitive member that includes an electro-conductive support, a photosensitive layer and a surface layer, in this order, wherein the surface layer includes a copolymerized product of a composition including a polymerizable compound and a metal oxide particle having a polymerizable functional group on a surface thereof, wherein the polymerizable compound includes a chemical compound represented by the following Formula (1).

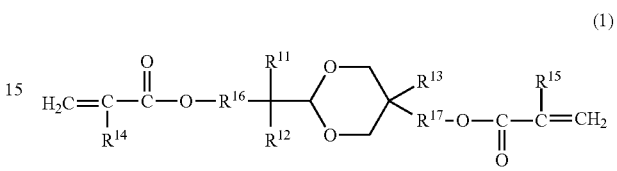

wherein $R^{11}$ and $R^{12}$ each independently represent an alkyl group having 1 to 4 carbon atoms or a substituted or unsubstituted aryl group; a substituent which the aryl group has is an alkyl group having 4 or less carbon atoms. $R^{11}$ and $R^{12}$ may combine with each other to form a ring; $R^{13}$ represents an alkyl group having 1 to 4 carbon atoms; $R^{14}$ and $R^{15}$ each independently represent a hydrogen atom or a methyl group; $R^{16}$ and $R^{17}$ each independently represent an alkylene group having 1 to 4 carbon atoms.

The present disclosure also relates to a process cartridge integrally supporting the electrophotographic photosensitive member and at least one unit selected from the group consisting of a charging unit, a developing unit and a cleaning unit, the process cartridge being detachably attachable to a main body of the electrophotographic apparatus.

The present disclosure also relates to an electrophotographic apparatus including the electrophotographic photosensitive member, a charging unit, an exposure unit, a developing unit and a transfer unit.

Further features of the present disclosure will become apparent from the following description of exemplary embodiments with reference to the attached drawings.

DESCRIPTION OF THE EMBODIMENTS

Figure 1:
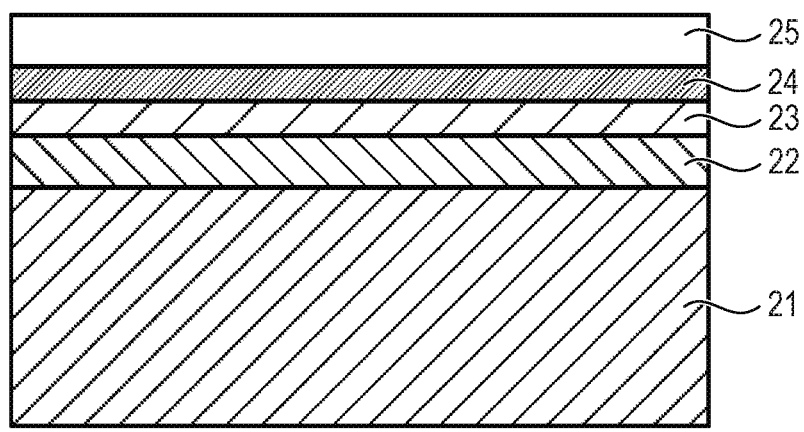
FIG. 1 illustrates a schematic view illustrating one example of a structure of the electrophotographic photosensitive member of the present disclosure.

Preferred embodiments of the present disclosure will now be described in detail in accordance with the accompanying drawings.

The present disclosure relates to an electrophotographic photosensitive member having an electro-conductive support, a photosensitive layer and a surface layer, in this order, wherein the surface layer includes a copolymerized product of a composition including a polymerizable compound and a metal oxide particle having a polymerizable functional group on the surface thereof, wherein the polymerizable compound includes a chemical compound represented by the following Formula (1).

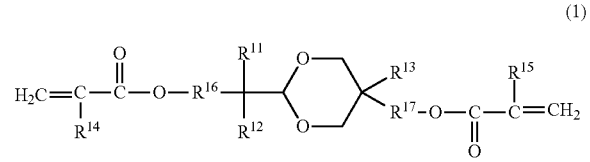

wherein $R^{11}$ and $R^{12}$ each independently represent an alkyl group having 1 to 4 carbon atoms or a substituted or unsubstituted aryl group; a substituent which the aryl group has is an alkyl group having 4 or less carbon atoms; $R^{11}$ and $R^{12}$ may combine with each other to form a ring; $R^{13}$ represents an alkyl group having 1 to 4 carbon atoms; $R^{14}$ and $R^{15}$ each independently represent a hydrogen atom or a methyl group; $R^{16}$ and $R^{17}$ each independently represent an alkylene group having 1 to 4 carbon atoms.

As a result of intensive studies, the present inventors have found that when the surface layer of the electrophotographic photosensitive member includes a copolymerized product a composition including of a polymerizable compound that contains the chemical compound represented by the Formula (1) and a metal oxide particle having a polymerizable functional group on its surface, an electrophotographic photosensitive member is obtained in which the occurrence of the image deletion is suppressed while the abrasion resistance is maintained.

The present inventors presume the reason why the occurrence of the image deletion is suppressed in the electrophotographic photosensitive member of the present disclosure to be as follows.

The surface layer includes the copolymerized product of the composition including the polymerizable compound that contains the chemical compound represented by the Formula (1), and the metal oxide particle having the polymerizable functional group on its surface, and thereby the surface layer having high density is obtained. Because of this, the surface layer can suppress the permeation of water even though containing the metal oxide, and accordingly the intrusion of water into the surface layer can be suppressed. It is presumed that as a result, the surface layer is obtained in which the intrusion of water into the film is unlikely to occur to thereby allow the chemical deterioration to hardly progress, even in a high-temperature and high-humidity environment in which the water easily adheres to the surface layer, and that the effect of suppressing the image deletion is thus enhanced.

Here, it is desirable that a mass ratio of the content $M_\alpha$ of the chemical compound represented by the Formula (1) in the surface layer to the content $M_\beta$ of the metal oxide particles, $M_\alpha/M_\beta$, satisfy Expression (A) $1 \leq M_\alpha/M_\beta \leq 45$.

Embodiments for carrying out the present disclosure will be described below in detail.

[Electrophotographic Photosensitive Member]

The structure of the electrophotographic photosensitive member according to the present disclosure is a structure in which an undercoat layer, a charge generation layer and a charge transport layer are multilayered in this order on the support. If necessary, an electro-conductive layer may be provided between the charge generation layer and the support, and a surface layer may be provided on the charge transport layer.

FIG. 1 illustrates an example of a layer configuration of the electrophotographic photosensitive member of the present disclosure. In FIG. 1, an undercoat layer 22, a charge generation layer 23, a charge transport layer 24 and a surface layer 25 are multilayered on an electro-conductive support 21. In this case, the charge generation layer 23 and the charge transport layer 24 constitute a photosensitive layer, and the surface layer 25 is a protective layer. In addition, when the protective layer is not provided, the charge transport layer 24 is the surface layer. In the present disclosure, the protective layer provided on the charge transport layer 24 shall be the surface layer 25.

The surface layer includes a hole transporting compound having a chain polymerizable functional group, a copolymerized product of a composition containing the chemical compound represented by Formula (1), and a metal oxide particle. The electrophotographic photosensitive member of the present disclosure will be further described below, with reference to an example of an electrophotographic photosensitive member having a protective layer in which the protective layer is the surface layer 25.

The electrophotographic photosensitive member of the present disclosure may contain a charge transport substance in the surface layer. In addition, the photosensitive layer may be a monolayered type photosensitive layer which contains a charge generation substance and a charge transport substance.

A method for manufacturing the electrophotographic photosensitive member of the present disclosure includes a method including: preparing coating liquids for respective layers, which will be described later; and applying and drying each of the coating liquids in order of desired layers. Application methods of the coating liquid at this time include dip coating, spray coating, ink jet coating, roll coating, die coating, blade coating, curtain coating, wire bar coating and ring coating. Among the methods, the dip coating is preferable from the viewpoints of efficiency and productivity.

The structure of the electrophotographic photosensitive member of the present disclosure will be described below.

<Support>

In the electrophotographic photosensitive member of the present disclosure, it is preferable that the support 21 be an electro-conductive support having electro-conductivity. In addition, shapes of the support 21 include a cylindrical shape, a belt shape and a sheet shape. Among the supports, the cylindrical support is preferable. In addition, the surface of the support 21 may be subjected to electrochemical treatment such as anodization, blast treatment, cutting treatment and the like.

As a material of the support 21, a metal, a resin, glass and the like are preferable.

The metals include aluminum, iron, nickel, copper, gold, stainless steel, and alloys thereof. Among the metals, an aluminum support using aluminum is preferable.

In addition, it is preferable that the electro-conductivity be imparted to the resin or the glass by such treatment as to mix an electro-conductive material into the resin or glass or cover the resin or glass with the electro-conductive material.

<Electro-Conductive Layer>

In the electrophotographic photosensitive member of the present disclosure, an electro-conductive layer may be provided on the support. By the electro-conductive layer being provided, the support can conceal scratches and irregularities on its surface and can control the reflection of light on its surface.

It is preferable that the electro-conductive layer contain an electro-conductive particle and a resin.

Materials for the electro-conductive particle include a metal oxide, metal and carbon black. The metal oxides include zinc oxide, aluminum oxide, indium oxide, silicon oxide, zirconium oxide, tin oxide, titanium oxide, magnesium oxide, antimony oxide and bismuth oxide. The metals include aluminum, nickel, iron, nichrome, copper, zinc and silver.

Among the materials, it is preferable to use a metal oxide as the electro-conductive particle, and in particular, it is more preferable to use titanium oxide, tin oxide or zinc oxide.

When the metal oxide is used as the electro-conductive particle, the surface of the metal oxide may be treated with a silane coupling agent or the like, or the metal oxide may be doped with an element such as phosphorus or aluminum or an oxide thereof.

In addition, the electro-conductive particle may have a multilayered structure having a core material particle and a covering layer with which the particle is covered. The core material particles include titanium oxide, barium sulfate and zinc oxide. The covering layer includes a metal oxide such as tin oxide.

In addition, when the metal oxide is used as the electro-conductive particle, the volume average particle size is preferably 1 nm or larger and 500 nm or smaller, and is more preferably 3 nm or larger and 400 nm or smaller.

The resins include a polyester resin, a polycarbonate resin, a polyvinyl acetal resin, an acrylic resin, a silicone resin, an epoxy resin, a melamine resin, a polyurethane resin, a phenol resin and an alkyd resin.

In addition, the electro-conductive layer may further contain a concealing agent such as a silicone oil, a resin particle and titanium oxide.

The electro-conductive layer can be formed by preparing a coating liquid for an electro-conductive layer which contains the above materials and a solvent; forming the coating film of the coating liquid on the support; and drying the coating film. The solvents to be used for the coating liquid include an alcohol-based solvent, a sulfoxide-based solvent, a ketone-based solvent, an ether-based solvent, an ester-based solvent and an aromatic hydrocarbon-based solvent. Dispersion methods for dispersing the electro-conductive particles in the coating liquid for the electro-conductive layer include a method using a paint shaker, a sand mill, a ball mill, or a liquid collision type high speed disperser.

It is preferable for the average film thickness of the electro-conductive layer to be 0.1 µm or larger and 50 µm or smaller, and is particularly preferable to be 3 µm or larger and 40 µm or smaller.

<Undercoat Layer>

In the electrophotographic photosensitive member of the present disclosure, an undercoat layer 22 may be provided on the support or the electro-conductive layer. The undercoat layer 22 thus provided can enhance an adhesion function between layers, and impart a charge injection inhibition function.

It is preferable that the undercoat layer 22 contain a resin. In addition, the undercoat layer 22 may be formed as a cured film by polymerization of a composition which contains a monomer having a polymerizable functional group.

The resin includes a polyester resin, a polycarbonate resin, a polyvinyl acetal resin, an acrylic resin, an epoxy resin, a melamine resin, a polyurethane resin, a phenol resin, a polyvinyl phenol resin, an alkyd resin, a polyvinyl alcohol resin, a polyethylene oxide resin, a polypropylene oxide resin, a polyamide resin, a polyamic acid resin, a polyimide resin, a polyamide imide resin and a cellulose resin.

The polymerizable functional group which the monomer having the polymerizable functional group has includes an isocyanate group, a blocked isocyanate group, a methylol group, an alkylated methylol group, an epoxy group, a metal alkoxide group, a hydroxyl group, an amino group, a carboxyl group, a thiol group, a carboxylic acid anhydride group and a carbon-carbon double bond group.

In addition, the undercoat layer 22 may further contain an electron transport substance, a metal oxide, a metal, an electro-conductive polymer and the like, for the purpose of enhancing the electric characteristics. Among the substances, it is preferable to use the electron transport substance and the metal oxide.

The electron transport substances include a quinone compound, an imide compound, a benzimidazole compound, a cyclopentadienylidene compound, a fluorenone compound, a xanthone compound, a benzophenone compound, a cyanovinyl compound, a halogenated aryl compound, a silole compound and a boron-containing compound. The undercoat layer 22 may be formed as a cured film by using an electron transport substance having a polymerizable functional group as the electron transport substance, and copolymerizing the electron transport substance with a monomer having the above polymerizable functional group.

The metal oxides include indium tin oxide, tin oxide, indium oxide, titanium oxide, zinc oxide, aluminum oxide and silicon dioxide. The metals include gold, silver and aluminum.

The metal oxide particle contained in the undercoat layer 22 may be subjected to a surface treatment which uses a surface treatment agent such as a silane coupling agent.

A general method is used for the surface treatment of the metal oxide particle. The methods include, for instance, a dry method and a wet method.

The dry method includes: while stirring the metal oxide particles in a mixer such as a Henschel mixer which can stir at a high speed, adding thereto an alcoholic aqueous solution, an organic solvent solution or an aqueous solution containing a surface treatment agent; uniformly dispersing the metal oxide particles; and drying the metal oxide particles.

The wet method includes: dispersing the metal oxide particles and the surface treatment agent in a solvent by stirring or by a sand mill with glass beads or the like; and after dispersing, removing the solvent by filtration or distillation under a reduced pressure. After the solvent has been removed, it is preferable to bake the metal oxide particles at 100° C. or higher.

The undercoat layer 22 may further contain an additive, and can contain, for example, a known material including a powder of a metal such as aluminum; an electro-conductive substance such as carbon black; a charge transport substance; a metal chelate compound; and an organometallic compound.

The charge transport substances include a quinone compound, an imide compound, a benzimidazole compound, a cyclopentadienylidene compound, a fluorenone compound, a xanthone compound, a benzophenone compound, a cyanovinyl compound, a halogenated aryl compound, a silole compound and a boron-containing compound. The undercoat layer may be formed as a cured film by using a charge transport substance having a polymerizable functional group, as the charge transport substance, and copolymerizing the charge transport substance with a monomer having the above polymerizable functional group.

The undercoat layer 22 can be formed by preparing a coating liquid for the undercoat layer containing the above materials and a solvent, forming a coating film of the coating liquid on the support or the electro-conductive layer, and drying and/or curing the coating film.

The solvents to be used for the coating liquid for the undercoat layer include organic solvents such as alcohols, sulfoxides, ketones, ethers, esters, aliphatic halogenated hydrocarbons and aromatic compounds. In the present disclosure, it is preferable to use the alcohol-based or ketone-based solvent.

Dispersing methods for preparing the coating liquid of the undercoat layer include methods which use a homogenizer, an ultrasonic dispersing machine, a ball mill, a sand mill, a roll mill, a vibration mill, an attritor and a liquid-collision type high-speed dispersing machine, respectively.

It is preferable for the average film thickness of the undercoat layer 22 to be 0.05 μm or larger and 50 μm or smaller, and is more preferable to be 0.3 μm or larger and 25 μm or smaller.

<Photosensitive Layer>

The photosensitive layer of the electrophotographic photosensitive member of the present disclosure may be any one of (1) a multilayered type photosensitive layer or (2) a monolayered type photosensitive layer. (1) The multilayered type photosensitive layer is a photosensitive layer which has a charge generation layer 23 containing a charge generation substance, and a charge transport layer 24 containing a charge transport substance. (2) The monolayered type photosensitive layer is a photosensitive layer which contains both of the charge generation substance and the charge transport substance.

(1) Multilayered Type Photosensitive Layer

The multilayered type photosensitive layer includes the charge generation layer 23, and the charge transport layer 24.

(1-1) Charge Generation Layer

It is preferable that the charge generation layer 23 contain the charge generation substance and a resin.

The charge generation substances include an azo pigment, a perylene pigment, a polycyclic quinone pigment, an indigo pigment and a phthalocyanine pigment. Among the pigments, the azo pigment and the phthalocyanine pigment are preferable. Among the phthalocyanine pigments, titanyl phthalocyanine pigment, chlorogallium phthalocyanine pigment and hydroxygallium phthalocyanine pigment are more preferable. Furthermore, from the viewpoint of high sensitivity, the chemical compound represented by the Formula (3) is particularly preferable. By using the chemical compound represented by the Formula (3), a deeper latent image can be formed.

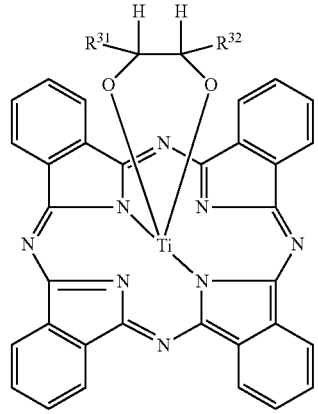

(3)

wherein $R^{31}$ and $R^{32}$ each represent hydrogen or an alkyl group having 2 or less carbon atoms, and the total number of carbon atoms of $R^{31}$ and $R^{32}$ is 2.

It is preferable for a content of the charge generation substance in the charge generation layer 23 to be 40% by mass or more and 85% by mass or less, and is more preferable to be 60% by mass or more and 80% by mass or less, with respect to a total mass of the charge generation layer 23.

The resins include a polyester resin, a polycarbonate resin, a polyvinyl acetal resin, a polyvinyl butyral resin, an acrylic resin, a silicone resin, an epoxy resin, a melamine resin, a polyurethane resin, a phenol resin, a polyvinyl alcohol resin, a cellulose resin, a polystyrene resin, a polyvinyl acetate resin and a polyvinyl chloride resin. Among the resins, the polyvinyl butyral resin is more preferable.

In addition, the charge generation layer 23 may further contain additives such as an antioxidizing agent and an ultraviolet absorbing agent. Specific additives include a hindered phenol compound, a hindered amine compound, a sulfur compound, a phosphorus compound and a benzophenone compound.

The charge generation layer 23 can be formed by preparing a coating liquid for a charge generation layer containing the above materials and a solvent, forming a coating film of the coating liquid on the undercoat layer, and drying the coating film. The solvents to be used for the coating liquid include an alcohol-based solvent, a sulfoxide-based solvent, a ketone-based solvent, an ether-based solvent, an ester-based solvent and an aromatic hydrocarbon-based solvent.

It is preferable for the average film thickness of the charge generation layer 23 to be 0.1 μm or larger and 1 μm or smaller, and is more preferable to be 0.15 μm or larger and 0.4 μm or smaller.

(1-2) Charge Transport Layer

It is preferable that a charge transport layer 24 contain a charge transport substance and a resin.

The charge transport substances include a polycyclic aromatic compound, a heterocyclic compound, a hydrazone compound, a styryl compound, an enamine compound, a benzidine compound, a triarylamine compound, and resins having a group derived from these substances. Among the substances, a chemical compound represented by Formula (2) is preferable.

$$A\text{-}(\text{-}R^{21}\text{-}Q)_k \qquad (2)$$

wherein A represents a hole transporting group. Q represents an acidic group. $R^{21}$ represents a substituted or unsubstituted alkylene group, alkenylene group, alkynylene group or arylene group; k represents a positive integer of 1 or larger; when k represents an integer of 2 or larger, $R^{21}$ and Q each may be the same or different.
Specific examples (2-1) to (2-10) of the charge transport substance will be shown below; but the present disclosure is not limited by these examples.
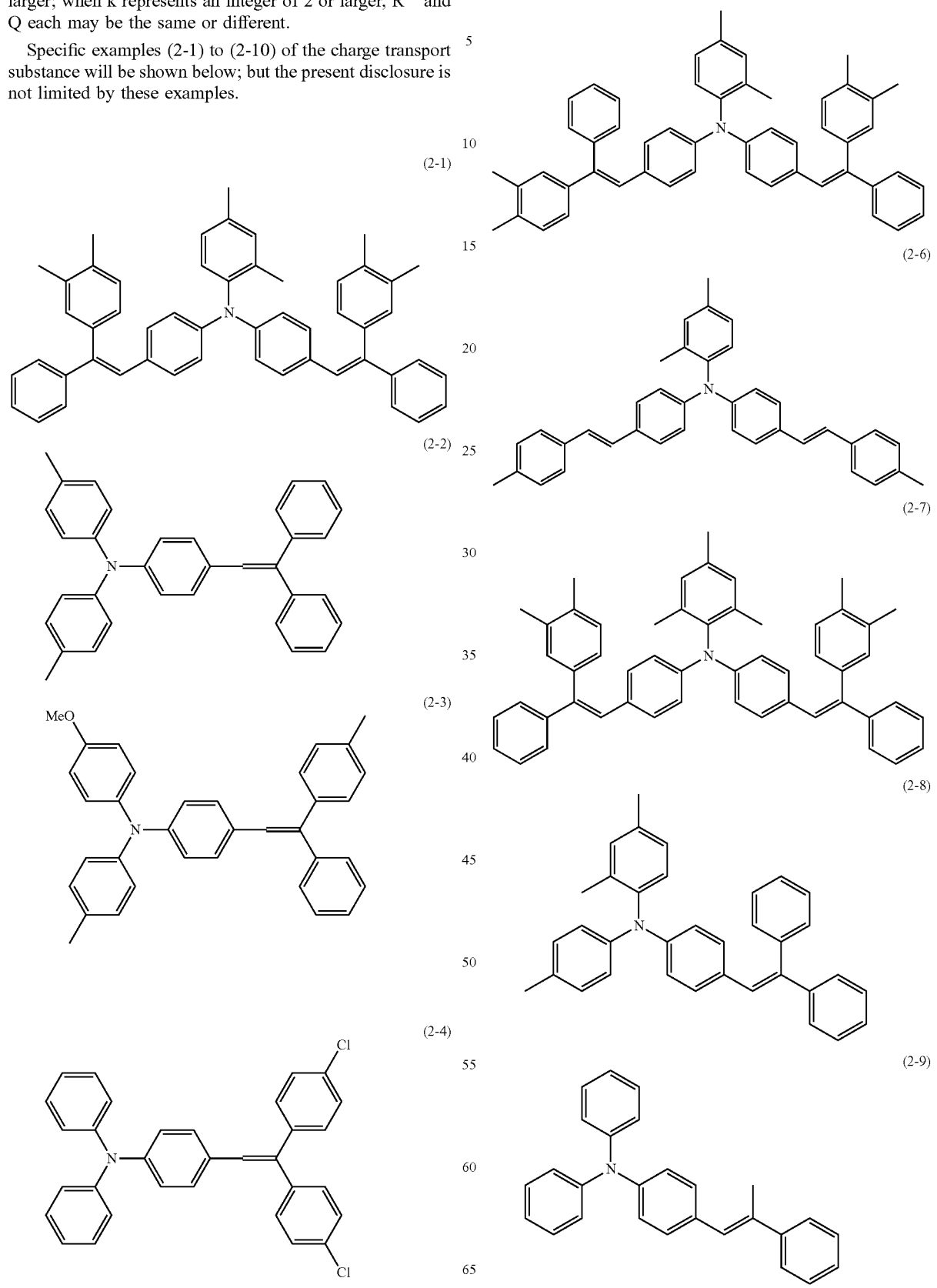

-continued (2-10)

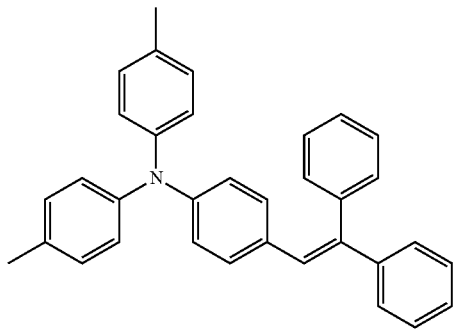

A content of the charge transport substance in the charge transport layer 24 is preferably 25% by mass or more and 70% by mass or less, and is more preferably 30% by mass or more and 55% by mass or less, with respect to a total mass of the charge transport layer 24.

The resins include a polyester resin, a polycarbonate resin, an acrylic resin and a polystyrene resin. Among the resins, the polycarbonate resin and the polyester resin are preferable. In the polyester resins, a polyarylate resin is particularly preferable.

A ratio (mass ratio) between the content of the charge transport substance and that of the resin is preferably 4:10 to 20:10, and is more preferably 5:10 to 12:10.

In addition, the charge transport layer 24 may contain additives such as an antioxidizing agent, an ultraviolet absorbing agent, a plasticizing agent, a leveling agent, a slipperiness imparting agent and an abrasion resistance improver. The specific additives include a hindered phenol compound, a hindered amine compound, a sulfur compound, a phosphorus compound, a benzophenone compound, a siloxane modified resin, silicone oil, a fluorocarbon resin particle, a polystyrene resin particle, a polyethylene resin particle, a silica particle, an alumina particle and a boron nitride particle.

The charge transport layer 24 can be formed by preparing a coating liquid for the charge transport layer containing the above materials and a solvent, forming a coating film of the coating liquid on the charge generation layer 23, and drying the coating film. The solvents to be used for the coating liquid include an alcohol-based solvent, a ketone-based solvent, an ether-based solvent, an ester-based solvent, and an aromatic hydrocarbon-based solvent. Among the solvents, the ether-based solvent or the aromatic hydrocarbon-based solvent is preferable.

It is preferable for an average film thickness of the charge transport layer 24 to be 5 μm or larger and 50 μm or smaller, is more preferable to be 8 μm or larger and 40 μm or smaller, and is particularly preferable to be 10 μm or larger and 30 μm or smaller.

(2) Monolayered Type Photosensitive Layer

The monolayered type photosensitive layer can be formed by preparing a coating liquid for the photosensitive layer containing a charge generation substance, a charge transport substance, a resin and a solvent, forming the coating film of the coating liquid on the undercoat layer, and drying the coating film. The charge generation substance, the charge transport substance and the resin are the same as the materials exemplified in the above "(1) multilayered type photosensitive layer".

<Surface Layer>

In the present disclosure, a protective layer is provided on the photosensitive layer, which becomes a surface layer 25. By providing the protective layer, the electrophotographic photosensitive member can improve its durability.

The surface layer 25 includes a copolymerized product of a composition including a polymerizable compound and a metal oxide particle having a polymerizable functional group on its surface, wherein the polymerizable compound contains a chemical compound represented by Formula (1).

The chemical compounds represented by the Formula (1) include chemical compounds represented by the Formulae (1-1) to (1-22).

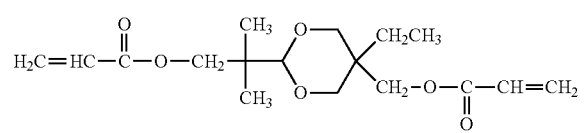
(1-1)

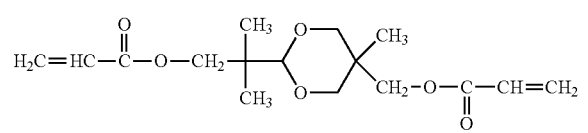
(1-2)

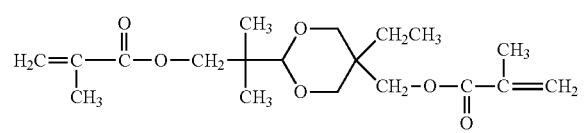
(1-3)

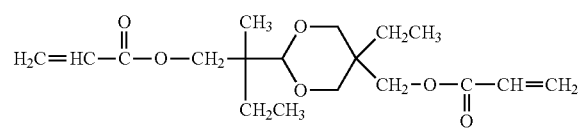
(1-4)

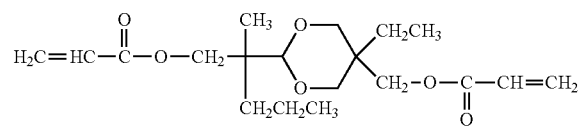
(1-5)

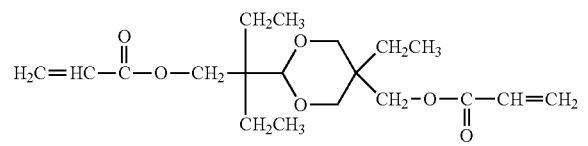
(1-6)

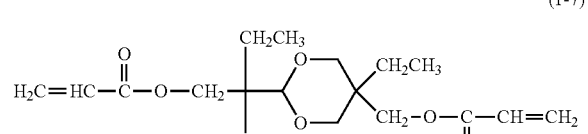
(1-7)

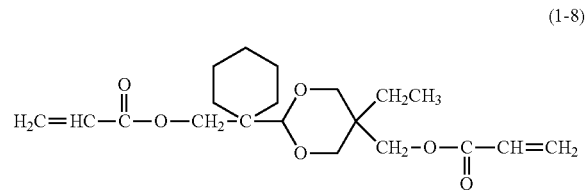
(1-8)

As the polymerizable compound, a hole transporting compound having a chain polymerizable functional group and/or a non-hole transporting compound having a chain polymerizable functional group may be used. It is preferable that the chain polymerizable functional group be selected from a group showing functional groups that can cause chain polymerization, which includes groups represented by the following Formulae (P-1) to (P-7). The chain polymerizable compound having the chain polymerizable functional group polymerizes and thus the surface layer of the electrophotographic photosensitive member forms a dense crosslinked structure; and accordingly, an electrophotographic photosensitive member can be obtained which exhibits satisfactory abrasion resistance.

-continued

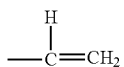
(P-5)

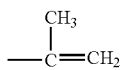
(P-6)

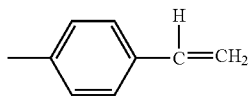
(P-7)

Among the functional groups, any one of the Formulae (P-1) and (P-2) is particularly preferable, and can provide an electrophotographic photosensitive member that exhibits more satisfactory abrasion resistance.

The hole transporting compounds each having a chain polymerizable functional group include a polycyclic aromatic compound, a heterocyclic compound, a hydrazone compound, a styryl compound, an enamine compound, a benzidine compound, a triarylamine compound, and resins each having a group derived from these substances.

The non-hole transporting compound having a chain polymerizable functional group is preferably any one of the chemical compounds represented by the following Formulae (5) and (6), and can provide an electrophotographic photosensitive member which exhibits more satisfactory abrasion resistance.

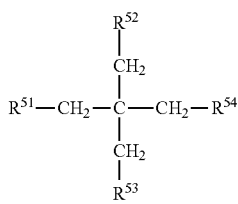
(5)

wherein $R^{51}$ to $R^{54}$ are each any one of hydrogen, an alkyl group having 1 to 2 carbon atoms, a hydroxy group, an acryloyloxy group and a methacryloyloxy group, and the total number of the acryloyloxy group and the methacryloyloxy group in the chemical compound represented by the Formula (5) is 3 or 4.

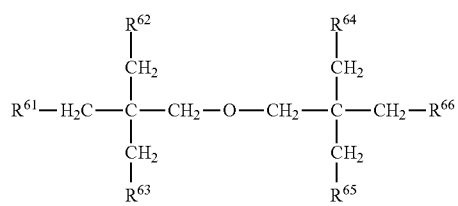
(6)

wherein $R^{61}$ to $R^{66}$ each represent any one of hydrogen, an alkyl group having 1 to 2 carbon atoms, a hydroxy group, an acryloyloxy group and a methacryloyloxy group, and the total number of the acryloyloxy group and the methacryloyloxy group in the chemical compound represented by the Formula (6) is 3 or more and 6 or less.

Specific examples (5-1) to (5-12) of the hole transporting compound having a chain polymerizable functional group and the non-hole transporting compound having a chain polymerizable functional group will be shown below, but the present disclosure is not limited by these examples.

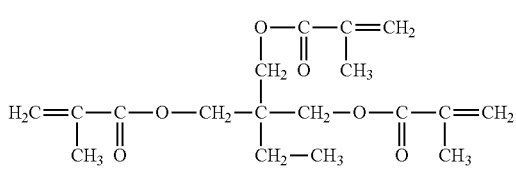
(5-1)

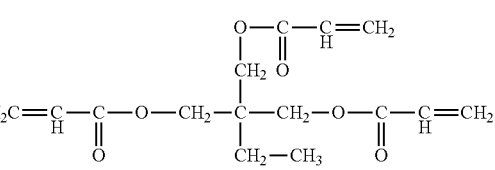
(5-2)

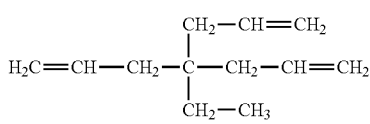
(5-3)

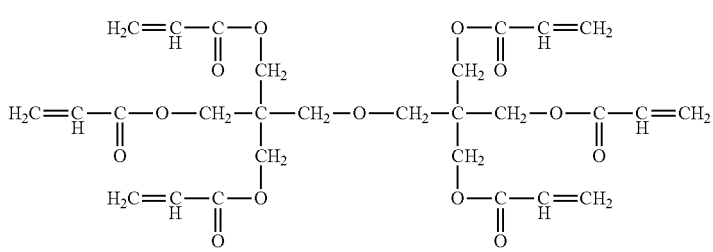
(5-4)

-continued

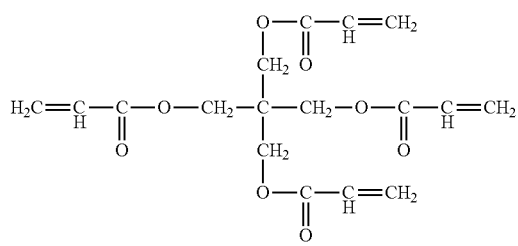
(5-5)

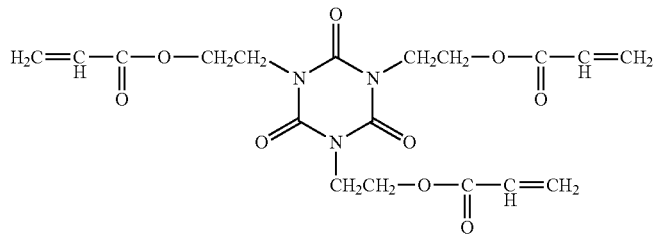
(5-6)

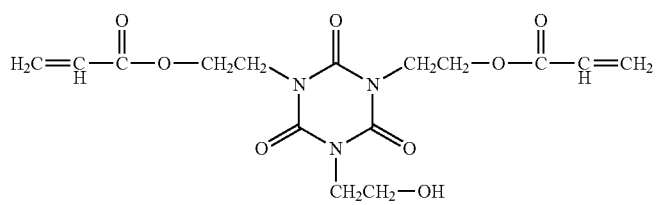
(5-7)

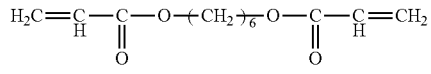
(5-8)

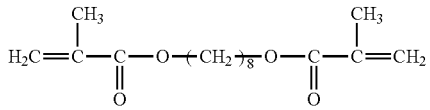
(5-9)

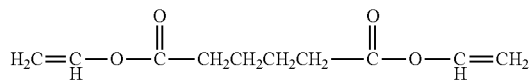
(5-10)

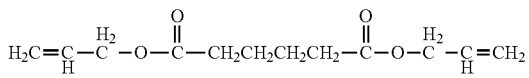
(5-11)

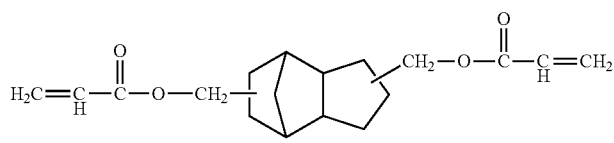
(5-12)

In addition, the surface layer 25 may be formed also as a cured film by the polymerization of a composition which contains a monomer having a polymerizable functional group. Reactions at this time include a thermal polymerization reaction, a photopolymerization reaction, and a radiation-induced polymerization reaction. The polymerizable functional groups of the monomer having a polymerizable functional group include an acryloyloxy group and a methacryloyloxy group. As a monomer having the polymerizable functional group, a material having charge transport capability may be used.

The surface layer 25 may contain a non-polymerizable hole transporting compound. The non-polymerizable hole transporting compounds include a polycyclic aromatic compound, a heterocyclic compound, a hydrazone compound, a styryl compound, an enamine compound, a benzidine compound, a triarylamine compound, and resins each having a group derived from these substances. Among the chemical compounds, the chemical compounds represented by the Formulae (4), (4') and (4") are preferable, because of suppressing the agglomeration of the hole transporting compounds, and can provide an electrophotographic photosensitive member which exhibits more satisfactory electric characteristics.

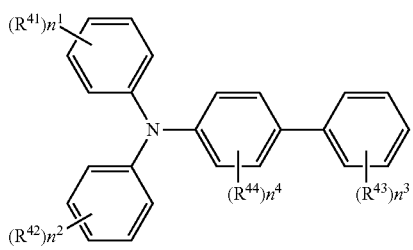
(4)

wherein $R^{41}$ to $R^{44}$ are each independently a hydrogen atom, an alkyl group having 1 to 3 carbon atoms, or an alkoxy group having 1 to 3 carbon atoms; $n^1$ to $n^3$ are each an integer of 1 or larger and 5 or smaller; $n^4$ is an integer of 1 or larger and 4 or smaller; and when $n^1$ to $n^4$ are each an integer of 2 or larger, a plurality of these groups may be the same or different.

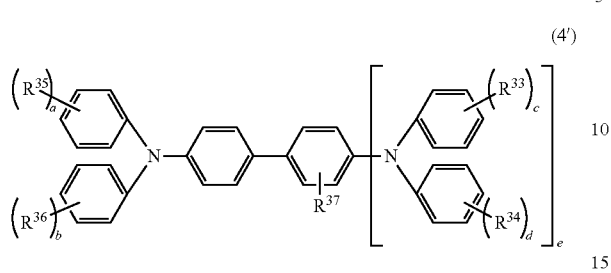
(4′)

wherein $R^{33}$ to $R^{36}$ each independently represent a hydrogen atom or an alkyl group having 1 to 4 carbon atoms; $R^{37}$ represents an alkyl group having 1 to 4 carbon atoms, or an alkoxy group having 1 to 4 carbon atoms; a, b, c and d each represent 0 to 5; and e represents 0 or 1.

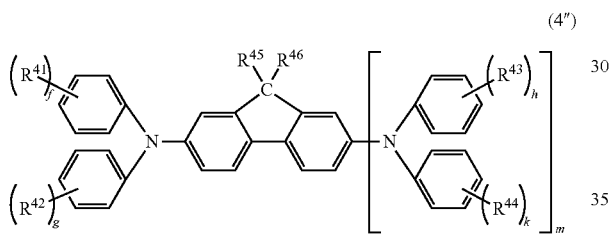
(4″)

wherein $R^{41}$ to $R^{44}$ each independently represent a hydrogen atom, an alkyl group having 1 to 3 carbon atoms, or an alkoxy group having 1 to 3 carbon atoms; $R^{45}$ and $R^{46}$ each independently represent an alkyl group having 1 to 8 carbon atoms; f, g, h and k each represent 0 to 5; and m represents 0 or 1.

Specific examples of the chemical compounds represented by the Formulae (4), (4′) and (4″) will be shown below as exemplified compounds (4-1) to (4-9), but the present disclosure is not limited by the exemplified compounds.

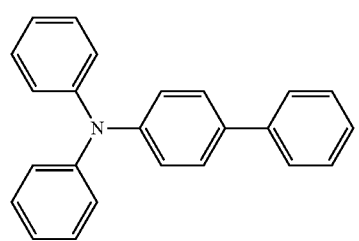
(4-1)

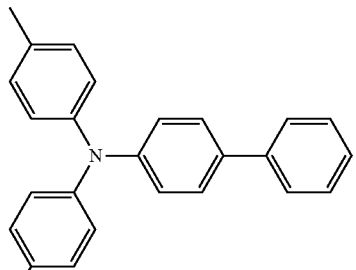
(4-2)

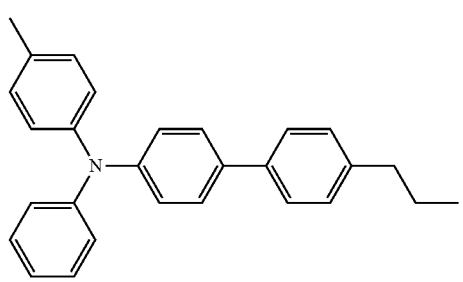
(4-3)

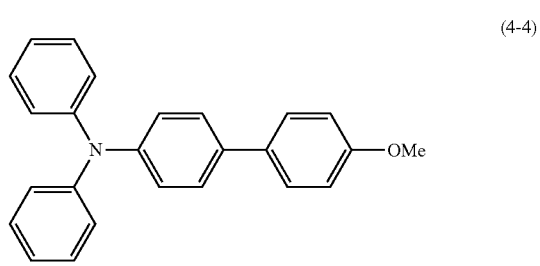
(4-4)

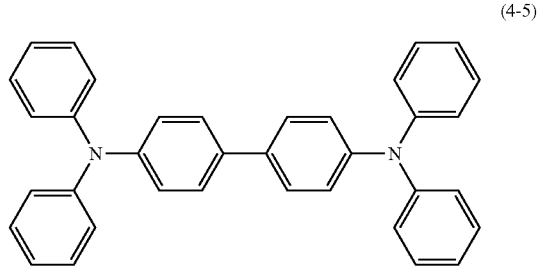
(4-5)

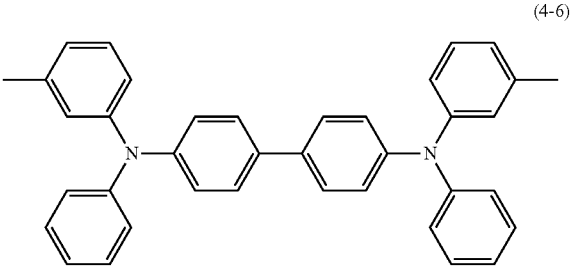
(4-6)

-continued (4-7)
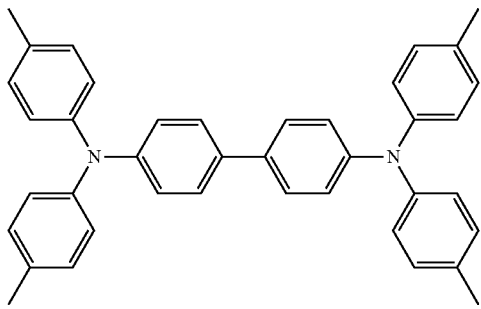

(4-8)
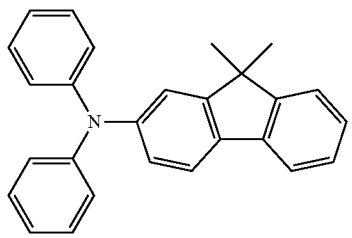

(4-9)
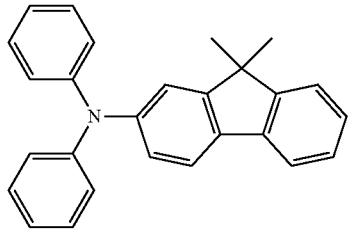

The metal oxide particles having a polymerizable functional group on the surface, which are to be contained in the surface layer 25, are obtained by subjecting the metal oxide particles (metal oxide particles as base material) to surface treatment with a surface treatment agent.

The metal oxide particles as the base material include magnesium oxide, zinc oxide, lead oxide, aluminum oxide, silicon oxide, tantalum oxide, indium oxide, bismuth oxide, yttrium oxide, cobalt oxide, copper oxide, manganese oxide, selenium oxide, iron oxide, zirconium oxide, germanium oxide, tin oxide, titanium oxide, niobium oxide, molybdenum oxide and vanadium oxide. Among the metal oxide particles, the zinc oxide, tin oxide and titanium oxide are preferable. These metal oxide particles may be used alone or in combination of two or more thereof.

The surface treatment agent to be used for the surface treatment has a chain polymerizable functional group. It is preferable that the surface treatment agent has a chain polymerizable functional group selected from a group showing functional groups that can cause chain polymerization, which includes groups represented by Formulae (P-1) to (P-7), for example. Among the functional groups, any one of the groups represented by the Formulae (P-1) and (P-2) is particularly preferable which have each a methacryloyl group or an acryloyl group, and can provide an electrophotographic photosensitive member that exhibits more satisfactory abrasion resistance.

These surface treatment agents may be used alone or in combination of two or more thereof.

A general method is used for the surface treatment of the metal oxide particle. The methods include, for instance, a dry method and a wet method.

Specific examples (S-1) to (S-18) of the surface treatment agent will be shown below, but the present disclosure is not limited by these examples.

(S-1)
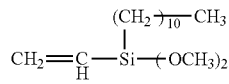

(S-2)
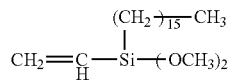

(S-3)
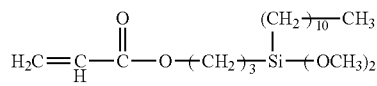

(S-4)
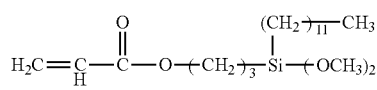

(S-5)
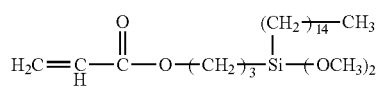

(S-6)
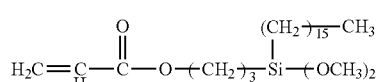

(S-7)
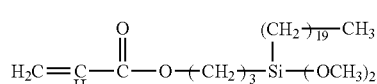

(S-8)
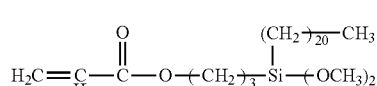

(S-9)
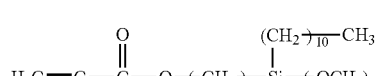

(S-10)

(S-11)
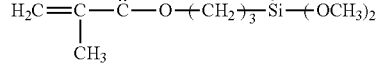

(S-12)
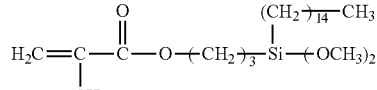

(S-13)

(S-14)

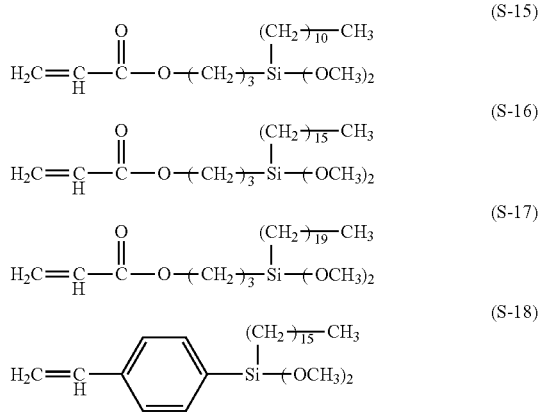

It is preferable for the number average primary particle size of the metal oxide particles contained in the surface layer 25 to be 5 nm or larger and 0.5 μm or smaller, and is more preferable to be 20 nm or larger and 0.4 μm or smaller.

The surface layer may contain a resin. The resins include a polyester resin, an acrylic resin, a phenoxy resin, a polycarbonate resin, a polystyrene resin, a phenol resin, a melamine resin and an epoxy resin. Among the resins, the polycarbonate resin, the polyester resin and the acrylic resin are preferable.

In addition, the surface layer may contain additives such as an antioxidizing agent, an ultraviolet absorbing agent, a plasticizing agent, a leveling agent, a slipperiness imparting agent and an abrasion resistance improver. The specific additives include a hindered phenol compound, a hindered amine compound, a sulfur compound, a phosphorus compound, a benzophenone compound, a siloxane modified resin, silicone oil, a fluorocarbon resin particle, a polystyrene resin particle, a polyethylene resin particle, a silica particle and a boron nitride particle.

The surface layer can be formed by preparing a coating liquid for the surface layer containing the above materials and a solvent, forming the coating film of the coating liquid on the photosensitive layer (charge transport layer 24), and drying and/or curing the coating film. The solvents to be used for the coating liquid include an alcohol-based solvent, a ketone-based solvent, an ether-based solvent, a sulfoxide-based solvent, an ester-based solvent and an aromatic hydrocarbon-based solvent.

It is preferable for the average film thickness of the surface layer to be 0.1 μm or larger and 15 μm or smaller, and is more preferable to be 0.5 μm or larger and 10 μm or smaller.

<Surface Working of Electrophotographic Photosensitive Member>

In the present disclosure, the surface of the electrophotographic photosensitive member may be worked. By carrying out the surface working, a behavior of a cleaning unit (cleaning blade) can be more stabilized which is brought into contact with the electrophotographic photosensitive member. Methods of surface working include: a method including bringing a mold having protruding portions into press contact with the surface of the electrophotographic photosensitive member, and transferring the shape to the surface; and a method including imparting recessed and protruding shapes by mechanical polishing. The recessed portions or the protruding portions which have been provided on the surface layer of the electrophotographic photosensitive member in the above described manner can further stabilize the behavior of the cleaning unit that comes into contact with the electrophotographic photosensitive member.

The above recessed portions or protruding portions may be formed on the whole area of the surface of the electrophotographic photosensitive member, or may be formed on a part of the surface of the electrophotographic photosensitive member. In the case where the recessed portions or the protruding portions are formed on the part of the surface of the electrophotographic photosensitive member, it is preferable that the recessed portions or the protruding portions be formed at least on the whole area of a contact region with the cleaning unit (cleaning blade).

In the case where the recessed portions are formed, the recessed portions can be formed on the surface of the electrophotographic photosensitive member, by bringing a mold having the protruding portions corresponding to the recessed portions into pressure contact with the surface of the electrophotographic photosensitive member, and transferring the shapes to the surface.

[Process Cartridge and Electrophotographic Apparatus]

The process cartridge of the present disclosure integrally supports the electrophotographic photosensitive member of the present disclosure described above, and at least one unit selected from the group consisting of a charging unit, a developing unit and a cleaning unit; and is detachably attachable to a main body of an electrophotographic apparatus.

In addition, the electrophotographic apparatus of the present disclosure includes the electrophotographic photosensitive member described above, a charging unit, an exposure unit, a developing unit and a transfer unit.

Figure 2:
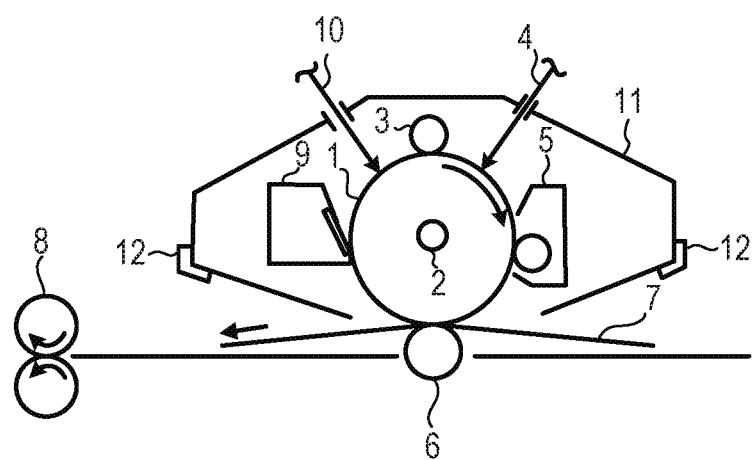
FIG. 2 illustrates a view illustrating one example of a schematic configuration of a process cartridge equipped with the electrophotographic photosensitive member of the present disclosure, and an electrophotographic apparatus provided with the process cartridge.

FIG. 2 illustrates one example of a schematic configuration of an electrophotographic apparatus having a process cartridge 11 provided with an electrophotographic photosensitive member 1.

A cylindrical (drum-shaped) electrophotographic photosensitive member 1 is rotationally driven around a shaft 2 in an arrow direction at a predetermined circumferential speed (process speed). The surface of the electrophotographic photosensitive member 1 is charged to a predetermined positive or negative potential by the charging unit 3 during the rotation process. For information, in the FIG. 2, a roller charging system by a roller type charging member is illustrated, but a charging system such as a corona charging system, a proximity charging system or an injection charging system may also be adopted. The surface of the charged electrophotographic photosensitive member 1 is irradiated with exposure light 4 emitted from an exposure unit (not illustrated), and an electrostatic latent image corresponding to objective image information is formed on the surface. The exposure light 4 is light of which the intensity is modulated so as to correspond to a time-series electric digital image signal of target image information, and is output from an image exposure unit such as a slit exposure or a laser beam scanning exposure. The electrostatic latent image formed on the surface of the electrophotographic photosensitive member 1 is developed (regularly developed or reversely developed) by a toner accommodated in a developing unit 5, and a toner image is formed on the surface of the electrophotographic photosensitive member 1. The toner image formed on the surface of the electrophotographic photosensitive member 1 is transferred onto a transfer material 7 by a transfer unit 6. At this time, a bias voltage which has a polarity opposite to the charge retained on the toner is applied to the transfer unit 6 from a bias power supply (not illustrated). In addition, when the transfer material 7 is paper, the transfer material 7 is taken out from a paper feeding unit (not illustrated) and is delivered to a portion between the electrophotographic photosensitive member 1 and the transfer unit 6 in synchronization with the rotation of the electrophotographic photosensitive member 1. The transfer material 7 on which the toner image has been transferred from the electrophotographic photosensitive member 1 is separated from the surface of the electrophotographic photosensitive member 1 and is conveyed to a fixing unit 8; and the toner image is subjected to a fixing process, and is printed out of the electrophotographic apparatus as a product having an image formed thereon (print or copy). The electrophotographic apparatus may have a cleaning unit 9 for removing an adherent such as a toner remaining on the surface of the electrophotographic photosensitive member 1 after transferring. Alternatively, a cleaning unit may not be separately provided, but a so-called cleaner-less system may be used that removes the above adherent by a developing unit or the like. In the present disclosure, the process cartridge 11 can be formed by accommodating a plurality of components among the components selected from the above electrophotographic photosensitive member 1, charging unit 3, developing unit 5 and cleaning unit 9 in a container, and integrally supporting the components, and can be structured to be detachably attachable to a main body of the electrophotographic apparatus. For example, the process cartridge is structured in the following way. A cartridge is formed so as to integrally support at least one selected from the charging unit 3, the developing unit 5, and the cleaning unit 9 together with the electrophotographic photosensitive member 1. This process cartridge can be formed into the process cartridge 11 which can be detachably attachable to the main body of the electrophotographic apparatus, with the use of a guide unit 12 such as a rail of the main body of the electrophotographic apparatus. The electrophotographic apparatus may have a neutralization mechanism that subjects the surface of the electrophotographic photosensitive member 1 to neutralization treatment by pre-exposure light 10 emitted from a pre-exposure unit (not illustrated). In addition, a guide unit 12 such as a rail may also be provided in order to detachably attach the process cartridge 11 of the present disclosure to a main body of the electrophotographic apparatus. The electrophotographic apparatus of the present disclosure includes an electrophotographic photosensitive member 1, and at least one unit selected from the group consisting of the charging unit 3, the exposure unit, the developing unit 5 and the transfer unit 6.

The electrophotographic photosensitive member of the present disclosure can be used in a laser beam printer, an LED printer, a copying machine, a facsimile, a combined machine thereof and the like.

EXAMPLES

The present disclosure will be described below in more detail with reference to Examples and Comparative Examples. The present disclosure is not limited to the following Examples at all, as long as the present disclosure does not exceed the gist thereof. Herein, the term "part(s)" in the following description of Examples means parts by mass unless otherwise specifically noted.

Example 1

Support

As a support (electro-conductive support), a cylindrical aluminum cylinder (JIS-A3003, aluminum alloy, diameter of 30 mm, length of 357.5 mm and wall thickness of 1.0 mm) was used.

Formation of Undercoat Layer

One part of a polyamide resin (trade name: CM8000, manufactured by Toray Industries, Inc.) was dissolved in 10 parts of methanol. To this solution, 3 parts of titanium oxide particles (trade name: SMT500SAS, manufactured by Tayca Co., Ltd.) were added, and the mixture was subjected to dispersing in a sand mill with glass beads having a diameter of 0.8 mm under an atmosphere of 23±3° C. for 10 hours, to thereby prepare a coating liquid for the undercoat layer.

The support was dip-coated with the obtained coating liquid for the undercoat layer, to thereby form a coating film thereon. The coating film was dried at 110° C. for 20 minutes, to thereby form an undercoat layer having a film thickness of 2.0 μm.

Formation of Charge Generation Layer

In 100 parts of α-chloronaphthalene, 5.0 parts of o-phthalodinitrile and 2.0 parts of titanium tetrachloride were stirred and heated at 200° C. for 3 hours, the mixture was cooled to 50° C., and the precipitated crystals were separated by filtration to obtain a paste of dichlorotitanium phthalocyanine. Next, this paste was stirred and washed in 100 parts of N, N-dimethylformamide which was heated to 100° C., and then was washed twice repeatedly in 100 parts of methanol at 60° C., followed by filtering. Furthermore, the obtained paste was stirred in 100 parts of deionized water at 80° C. for 1 hour, and the mixture was filtered, to thereby obtain a blue titanyl phthalocyanine pigment. Next, the pigment was dissolved in 30 parts of concentrated sulfuric acid, and the solution was dropped into 300 parts of deionized water at 20° C. which was being stirred to re-precipitate the pigment. The precipitate was separated by filtration, and sufficiently washed with water, to thereby obtain amorphous titanyl phthalocyanine.

To 150 parts of α-chloronaphthalene, 8 parts of the amorphous titanyl phthalocyanine which was obtained by the above method, and 2.0 parts of 2,3-butanediol (manufactured by Tokyo Chemical Industry Co., Ltd.) were mixed, and the mixture was stirred at a temperature of 180° C. for 6 hours. After that, the mixture was cooled to room temperature, and was then filtered. The filter cake was washed repeatedly with methanol, and was dried under reduced pressure, to thereby obtain a charge generation substance G-1, which was a reaction product of titanyl phthalocyanine and 2,3-butanediol.

The charge generation substance G-1 showed a peak at m/Z=648 in a mass spectrum. In addition, in an IR spectrum, the absorption was observed in the vicinity of 630 $cm^{-1}$, which was considered to originate in a structure of O—Ti—O. From the above, it was presumed that the charge generation substance G-1 was a single crystal of titanyl phthalocyanine adducted by 2,3-butanediol.

Next, 20 parts of charge generation substance G-1 were mixed with 10 parts of polyvinyl butyral resin (trade name: #6000-C, manufactured by Denka Company Limited), 700 parts of t-butyl acetate, and 300 parts of 4-methoxy-4-methyl-2-pentanone. After that, the mixture was subjected to dispersion treatment in a sand mill with glass beads having a diameter of 1 mm under an atmosphere of 23±3° C. for 10 hours, to thereby prepare a coating liquid for the charge generation layer.

The undercoat layer was dip-coated with the coating liquid for the charge generation layer, and the obtained coating film was dried at 90° C. for 10 minutes, to thereby form the charge generation layer having a film thickness of 0.3 μm.

Formation of Charge Transport Layer

Next, 225 parts of the chemical compound represented by the Formula (2-1), 300 parts by mass of a polycarbonate resin (trade name: Z300, manufactured by Mitsubishi Gas Chemical Company, Inc.), 6 parts of an antioxidizing agent (trade name: Irganox 1010, manufactured by Nihon Ciba-Geigy K. K.) and 1 part by mass of silicone oil KF-54 (manufactured by Shin-Etsu Chemical Co., Ltd.) were dissolved in a mixed solvent of 1600 parts by mass of tetrahydrofuran and 400 parts by mass of toluene, to thereby prepare a coating liquid for the charge transport layer. The charge generation layer was dip-coated with this coating liquid for the charge transport layer to form a coating film thereon, and the obtained coating film was dried at 100° C. for 30 minutes, to thereby form a charge transport layer having a film thickness of 20 μm.

Formation of Surface Layer

Into a wet sand mill, 100 parts by mass of tin oxide particles (number average primary particle size of 15 nm), 30 parts by mass of a silane coupling agent (trade name: KBM-503, manufactured by Shin-Etsu Silicone Co., Ltd.), and 900 parts by mass of methyl ethyl ketone were placed, and glass beads having a diameter of 0.5 mm were further added thereto. The mixture was subjected to dispersion treatment for 6 hours. After that, the methyl ethyl ketone and the glass beads were separated by filtration, and the remainder was dried at 60° C., to thereby obtain tin oxide particle M1, which was surface-treated with the silane coupling agent having a methacryloyloxy group.

Fifteen parts of the tin oxide particles M1 were mixed with 60 parts of the chemical compound represented by the Formula (1-1), 25 parts of a chemical compound represented by Formula (4-3), a polymerization initiator (trade name: Irgacure 819, manufactured by BASF Japan Ltd.), 320 parts of 2-butanol, and 40 parts of tetrahydrofuran. After that, the mixture was subjected to dispersion treatment in a sand mill with glass beads having a diameter of 0.5 mm under an atmosphere of 23±3° C. for 6 hours, to thereby prepare a coating liquid for the surface layer.

The charge transport layer was dip-coated with this coating liquid for the surface layer to form a coating film thereon. A metal halide lamp was used under a nitrogen atmosphere, and the coating film was irradiated with ultraviolet rays for 1 minute under such conditions that a distance from the light source to the surface of the photosensitive member was 50 mm and the output of the lamp was 4 kW. The obtained coating film was dried at 80° C. for 70 minutes, to thereby form a surface layer having a film thickness of 7 μm.

In this way, an electrophotographic photosensitive member was produced.

Example 2

An electrophotographic photosensitive member was produced in the same manner as in Example 1, except that the silane coupling agent (trade name: KBM-503, manufactured by Shin-Etsu Silicone Co., Ltd.) was changed to a silane coupling agent (trade name: KBM-5103, manufactured by Shin-Etsu Silicone Co., Ltd.).

Example 3

An electrophotographic photosensitive member was produced in the same manner as in Example 1, except that the tin oxide particles (number average primary particle size of 15 nm) were changed to titanium oxide particles (trade name: CR-EL, rutile ratio: 99.1%, manufactured by Ishihara Sangyo Kaisha Ltd.).

Example 4

An electrophotographic photosensitive member was produced in the same manner as in Example 1, except that the chemical compound represented by the Formula (2-1) was changed to a chemical compound represented by Formula (2-2).

Example 5

To 150 parts of α-chloronaphthalene, 8 parts of the amorphous titanyl phthalocyanine which was obtained by the method described in Example 1, and 0.75 parts of 2,3-butanediol (manufactured by Tokyo Chemical Industry Co., Ltd.) were mixed, and the mixture was stirred at a temperature of 60° C. for 6 hours. After that, the mixture was cooled to room temperature, and was then filtered. The filter cake was washed repeatedly with methanol, and was dried under reduced pressure, to thereby obtain a charge generation substance G-2, which was a reaction product of titanyl phthalocyanine and 2,3-butanediol.

Charge generation substance G-2 showed peaks at m/Z=576 and 648 in the mass spectrum. In addition, in the IR spectrum, absorptions were observed in the vicinity of 970 $cm^{-1}$, which was considered to originate in a structure of Ti=O, and in the vicinity of 630 $cm^{-1}$, which was considered to originate in a structure of the O—Ti—O. From the above, it was presumed that the charge generation substance G-2 was a mixed crystal of titanyl phthalocyanine adducted by 2,3-butanediol, and unadducted titanyl phthalocyanine.

An electrophotographic photosensitive member was produced in the same manner as in Example 1, except that the charge generation substance G-1 was changed to the charge generation substance G-2 to prepare a coating liquid for the charge generation layer.

Example 6

An electrophotographic photosensitive member was produced in the same manner as in Example 1, except that the chemical compound represented by the Formula (4-3) was changed to a chemical compound represented by Formula (4-4).

Example 7

An electrophotographic photosensitive member was produced in the same manner as in Example 1, except that the chemical compound represented by the Formula (1-1) was changed to a chemical compound represented by Formula (1-3) to prepare a coating liquid for the surface layer.

Example 8

An electrophotographic photosensitive member was produced in the same manner as in Example 1, except that the coating liquid for the surface layer was prepared in the following way.

Fifteen parts of the tin oxide particles M1 were mixed with 15 parts of the chemical compound represented by the following Formula (7), 60 parts of the chemical compound represented by the Formula (1-1), 10 parts of a chemical compound represented by the Formula (4-3), a polymerization initiator (trade name: Irgacure 819, manufactured by BASF Japan Ltd.), 320 parts of 2-butanol, and 40 parts of tetrahydrofuran. After that, the mixture was subjected to dispersion treatment in a sand mill with glass beads having a diameter of 0.5 mm under an atmosphere of 23±3° C. for 6 hours, to thereby prepare a coating liquid for the surface layer.

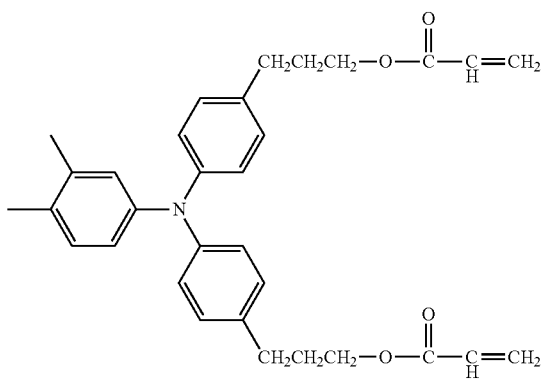

(7)

Example 9

An electrophotographic photosensitive member was produced in the same manner as in Example 8, except that the chemical compound represented by the Formula (7) was changed to a chemical compound represented by the following Formula (8) to prepare a coating liquid for the surface layer.

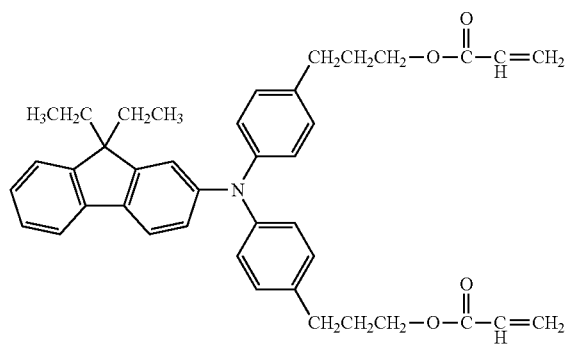

(8)

Example 10

An electrophotographic photosensitive member was produced in the same manner as in Example 1, except that a coating liquid for the surface layer was prepared in the following way.

Fifteen parts of the tin oxide particles M1 were mixed with 35 parts of the chemical compound represented by the Formula (1-1), 25 parts of a chemical compound represented by Formula (5-1), 25 parts of the chemical compound represented by the Formula (4-3), a polymerization initiator (trade name: Irgacure 819, manufactured by BASF Japan Ltd.), 320 parts of 2-butanol, and 40 parts of tetrahydrofuran. After that, the mixture was subjected to dispersion treatment in a sand mill with glass beads having a diameter of 0.5 mm under an atmosphere of 23±3° C. for 6 hours, to thereby prepare a coating liquid for the surface layer.

Example 11

An electrophotographic photosensitive member was produced in the same manner as in Example 1, except that a coating liquid for the surface layer was prepared in the following way.

Twelve parts of the tin oxide particles M1 were mixed with 15 parts of the chemical compound represented by the Formula (1-1), 25 parts of a chemical compound represented by the Formula (4-3), a polymerization initiator (trade name: Irgacure 819, manufactured by BASF Japan Ltd.), 320 parts of 2-butanol, and 40 parts of tetrahydrofuran. After that, the mixture was subjected to dispersion treatment in a sand mill with glass beads having a diameter of 0.5 mm under an atmosphere of 23±3° C. for 6 hours, to thereby prepare a coating liquid for the surface layer.

Example 12

An electrophotographic photosensitive member was produced in the same manner as in Example 1, except that a coating liquid for the surface layer was prepared in the following way.

The tin oxide particles M1 in an amount of 1.4 parts were mixed with 60 parts of the chemical compound represented by the Formula (1-1), 25 parts of a chemical compound represented by the Formula (4-3), a polymerization initiator (trade name: Irgacure 819, manufactured by BASF Japan Ltd.), 320 parts of 2-butanol, and 40 parts of tetrahydrofuran. After that, the mixture was subjected to dispersion treatment in a sand mill with glass beads having a diameter of 0.5 mm under an atmosphere of 23±3° C. for 6 hours, to thereby prepare a coating liquid for the surface layer.

Example 13

An electrophotographic photosensitive member was produced in the same manner as in Example 1, except that a coating liquid for the surface layer was prepared in the following way.

Fifteen parts of the tin oxide particles M1 were mixed with 10 parts of the chemical compound represented by the Formula (1-1), 25 parts of a chemical compound represented by the Formula (4-3), a polymerization initiator (trade name: Irgacure 819, manufactured by BASF Japan Ltd.), 320 parts of 2-butanol, and 40 parts of tetrahydrofuran. After that, the mixture was subjected to dispersion treatment in a sand mill with glass beads having a diameter of 0.5 mm under an atmosphere of 23±3° C. for 6 hours, to thereby obtain a coating liquid for the surface layer.

Example 14

An electrophotographic photosensitive member was produced in the same manner as in Example 1, except that a coating liquid for the surface layer was prepared in the following way.

The tin oxide particles M1 in an amount of 1.3 parts were mixed with 60 parts of the chemical compound represented by the Formula (1-1), 25 parts of a chemical compound represented by the Formula (4-3), a polymerization initiator (trade name: Irgacure 819, manufactured by BASF Japan Ltd.), 320 parts of 2-butanol, and 40 parts of tetrahydrofuran. After that, the mixture was subjected to dispersion treatment in a sand mill with glass beads having a diameter of 0.5 mm under an atmosphere of 23±3° C. for 6 hours, to thereby prepare a coating liquid for the surface layer.

Example 15

An electrophotographic photosensitive member was produced in the same manner as in Example 1, except that the silane coupling agent (trade name: KBM-503, manufactured by Shin-Etsu Silicone Co., Ltd.) was changed to a silane coupling agent (trade name: KBM-1003, manufactured by Shin-Etsu Silicone Co., Ltd.).

Example 16

An electrophotographic photosensitive member was produced in the same manner as in Example 1, except that the tin oxide particles (number average primary particle size of 15 nm) were changed to α-alumina (trade name: Sumicorundum® AA-03, manufactured by Sumitomo Chemical Company Limited).

Example 17

An electrophotographic photosensitive member was produced in the same manner as in Example 1, except that the chemical compound represented by the Formula (2-1) was changed to the chemical compound represented by the Formula (4-7).

Example 18

An electrophotographic photosensitive member was produced in the same manner as in Example 1, except that a coating liquid for the charge generation layer was prepared in the following way.

Four parts of a hydroxygallium phthalocyanine crystal (charge generation substance) which had a crystal form having strong peaks at 7.4° and 28.1° at Bragg angles 2θ±0.2° in CuKα characteristic X-ray diffraction, and 0.04 parts of a chemical compound represented by the following Structural Formula (9) were added to a liquid obtained by dissolving 2 parts of polyvinyl butyral (trade name: S-LEC BX-1, manufactured by Sekisui Chemical Co., Ltd.) in 100 parts of cyclohexanone. After that, the mixture was subjected to dispersion treatment in a sand mill with glass beads having a diameter of 1 mm under an atmosphere of 23±3° C. for 1 hour, and after the dispersion treatment, 100 parts of ethyl acetate was added, to thereby prepare a coating liquid for the charge generation layer.

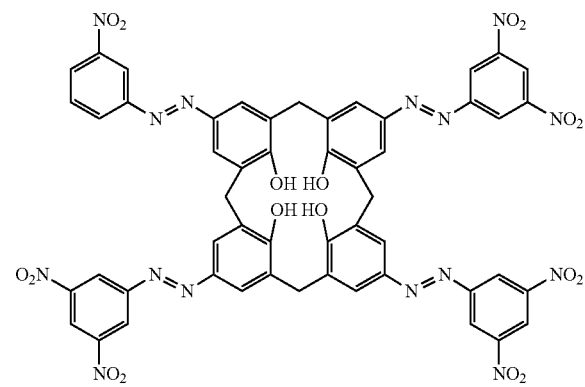

(9)

Example 19

An electrophotographic photosensitive member was produced in the same manner as in Example 1, except that the chemical compound represented by the Formula (4-3) was changed to a chemical compound represented by the following Formula (10).

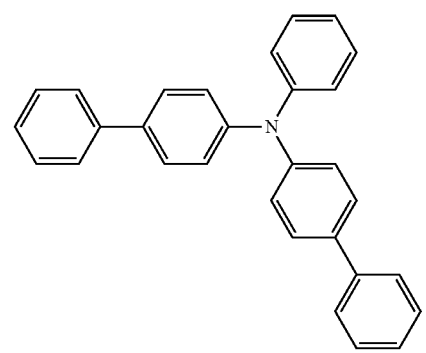

(10)

Example 20

An electrophotographic photosensitive member was produced in the same manner as in Example 1, except that the chemical compound represented by the Formula (1-1) was changed to a chemical compound represented by Formula (1-5) to prepare a coating liquid for the surface layer.

Example 21

An electrophotographic photosensitive member was produced in the same manner as in Example 1, except that the chemical compound represented by the Formula (1-1) was changed to a chemical compound represented by Formula (1-6) to prepare a coating liquid for the surface layer.

Example 22

An electrophotographic photosensitive member was produced in the same manner as in Example 21, except that the chemical compound represented by the Formula (4-3) was changed to a chemical compound represented by the Formula (10).

Example 23

An electrophotographic photosensitive member was produced in the same manner as in Example 22, except that a coating liquid for the charge generation layer was prepared in the following way.

Four parts of a hydroxygallium phthalocyanine crystal (charge generation substance) which had a crystal form having strong peaks at 7.4° and 28.1° at Bragg angles 2θ±0.2° in CuKα characteristic X-ray diffraction, and 0.04 parts of a chemical compound represented by the Structural Formula (10) were added to a liquid obtained by dissolving 2 parts of polyvinyl butyral (trade name: S-LEC BX-1, manufactured by Sekisui Chemical Co., Ltd.) in 100 parts of cyclohexanone. After that, the mixture was subjected to dispersion treatment in a sand mill with glass beads having a diameter of 1 mm under an atmosphere of 23±3° C. for 1 hour, and after the dispersion treatment, 100 parts of ethyl acetate was added thereto, to thereby prepare a coating liquid for the charge generation layer.

Example 24

An electrophotographic photosensitive member was produced in the same manner as in Example 23, except that the chemical compound represented by the Formula (2-1) was changed to a chemical compound represented by the Formula (9).

Example 25

An electrophotographic photosensitive member was produced in the same manner as in Example 24, except that the tin oxide particles (number average primary particle size of 15 nm) were changed to α-alumina (trade name: Sumicorundum® AA-03, manufactured by Sumitomo Chemical Company Limited).

Example 26

An electrophotographic photosensitive member was produced in the same manner as in Example 25, except that the silane coupling agent (trade name: KBM-503, manufactured by Shin-Etsu Silicone Co., Ltd.) was changed to a silane coupling agent (trade name: KBM-1003, manufactured by Shin-Etsu Silicone Co., Ltd.).

Example 27

An electrophotographic photosensitive member was produced in the same manner as in Example 26, except that a coating liquid for the surface layer was prepared in the following way.

Fifteen parts of the tin oxide particles M1 were mixed with 10 parts of the chemical compound represented by the Formula (1-1), 25 parts of a chemical compound represented by the Formula (4-3), a polymerization initiator (trade name: Irgacure 819, manufactured by BASF Japan Ltd.), 320 parts of 2-butanol, and 40 parts of tetrahydrofuran. After that, the mixture was subjected to dispersion treatment in a sand mill with glass beads having a diameter of 0.5 mm under an atmosphere of 23±3° C. for 6 hours, to thereby prepare a coating liquid for the surface layer.

Example 28

An electrophotographic photosensitive member was produced in the same manner as in Example 26, except that a coating liquid for the surface layer was prepared in the following way.

The tin oxide particles M1 in an amount of 1.3 parts were mixed with 60 parts of the chemical compound represented by the Formula (1-1), 25 parts of a chemical compound represented by the Formula (4-3), a polymerization initiator (trade name: Irgacure 819, manufactured by BASF Japan Ltd.), 320 parts of 2-butanol, and 40 parts of tetrahydrofuran. After that, the mixture was subjected to dispersion treatment in a sand mill with glass beads having a diameter of 0.5 mm under an atmosphere of 23±3° C. for 6 hours, to thereby prepare a coating liquid for the surface layer.

Comparative Example 1

An electrophotographic photosensitive member was produced in the same manner as in Example 6, except that the chemical compound represented by the Formula (1-1) was not used.

Comparative Example 2

An electrophotographic photosensitive member was produced in the same manner as in Example 10, except that the chemical compound represented by the Formula (1-1) was not used.

Comparative Example 3

An electrophotographic photosensitive member was produced in the same manner as in Example 5, except that the chemical compound represented by the Formula (1-1) was not used.

TABLE 1

| | Composition of surface layer | | | |
| --- | --- | --- | --- | --- |
| | | Surface-treated metal oxide particle | | |
| Example | Polymerizable compound | Surface treatment agent | Metal oxide particle | $M_\alpha/M_\beta$ |
| Example 1 | Chemical compound represented by Formula (1-1) | KBM-503 | Tin oxide | 4 |
| Example 2 | Chemical compound represented by Formula (1-1) | KBM-5103 | Tin oxide | 4 |
| Example 3 | Chemical compound represented by Formula (1-1) | KBM-503 | Titanium oxide | 4 |
| Example 4 | Chemical compound represented by Formula (1-1) | KBM-503 | Tin oxide | 4 |
| Example 5 | Chemical compound represented by Formula (1-1) | KBM-503 | Tin oxide | 4 |

TABLE 1-continued

Composition of surface layer

| | | Surface-treated metal oxide particle | | |
|---|---|---|---|---|
| Example | Polymerizable compound | Surface treatment agent | Metal oxide particle | $M_\alpha/M_\beta$ |
| Example 6 | Chemical compound represented by Formula (1-1) Chemical compound represented by Formula (4-4) | KBM-503 | Tin oxide | 4 |
| Example 7 | Chemical compound represented by Formula (1-3) | KBM-503 | Tin oxide | 4 |
| Example 8 | Chemical compound represented by Formula (1-1) Chemical compound represented by Formula (7) | KBM-503 | Tin oxide | 4 |
| Example 9 | Chemical compound represented by Formula (1-1) Chemical compound represented by Formula (8) | KBM-503 | Tin oxide | 4 |
| Example 10 | Chemical compound represented by Formula (1-1) Chemical compound represented by Formula (A-1) | KBM-503 | Tin oxide | 2 |
| Example 11 | Chemical compound represented by Formula (1-1) | KBM-503 | Tin oxide | 1.3 |
| Example 12 | Chemical compound represented by Formula (1-1) | KBM-503 | Tin oxide | 43 |
| Example 13 | Chemical compound represented by Formula (1-1) | KBM-503 | Tin oxide | 0.7 |
| Example 14 | Chemical compound represented by Formula (1-1) | KBM-503 | Tin oxide | 46 |
| Example 15 | Chemical compound represented by Formula (1-1) | KBM-1003 | Tin oxide | 4 |
| Example 16 | Chemical compound represented by Formula (1-1) | KBM-503 | α-alumina | 4 |
| Example 17 | Chemical compound represented by Formula (1-1) | KBM-503 | Tin oxide | 4 |
| Example 18 | Chemical compound represented by Formula (1-1) | KBM-503 | Tin oxide | 4 |
| Example 19 | Chemical compound represented by Formula (1-1) | KBM-503 | Tin oxide | 4 |
| Example 20 | Chemical compound represented by Formula (1-5) | KBM-503 | Tin oxide | 4 |
| Example 21 | Chemical compound represented by Formula (1-6) | KBM-503 | Tin oxide | 4 |
| Example 22 | Chemical compound represented by Formula (1-6) | KBM-503 | Tin oxide | 4 |
| Example 23 | Chemical compound represented by Formula (1-6) | KBM-503 | Tin oxide | 4 |
| Example 24 | Chemical compound represented by Formula (1-6) | KBM-503 | Tin oxide | 4 |
| Example 25 | Chemical compound represented by Formula (1-6) | KBM-503 | α-alumina | 4 |
| Example 26 | Chemical compound represented by Formula (1-6) | KBM-1003 | α-alumina | 4 |
| Example 27 | Chemical compound represented by Formula (1-1) | KBM-1003 | Tin oxide | 0.7 |
| Example 28 | Chemical compound represented by Formula (1-1) | KBM-1003 | Tin oxide | 46 |
| Comparative Example 1 | Chemical compound represented by Formula (4-4) | KBM-503 | Tin oxide | 0 |
| Comparative Example 2 | Chemical compound represented by Formula (A-1) | KBM-503 | Tin oxide | 0 |
| Comparative Example 3 | Chemical compound represented by Formula (4-3) | KBM-503 | Tin oxide | 0 |

<Evaluation of Electrophotographic Photosensitive Member>

The electrophotographic photosensitive members which were produced by the methods described in Examples 1 to 28 and Comparative Examples 1 to 3 were subjected to the evaluations of initial sensitivity and image deletion according to the following methods.

Evaluation of Initial Sensitivity

Initial sensitivity was measured according to the following method. A testing apparatus for the photosensitive member (trade name: CYNTHIA59, manufactured by Gentec Corporation) was used, and the conditions of a charging apparatus were set so that the surface of the electrophotographic photosensitive member became −700 V under an environment of normal temperature and normal humidity (23° C./50% RH) or an environment of high temperature and high humidity (30° C./85% RH). This electrophotographic photosensitive member was irradiated with monochromatic light having a wavelength of 780 nm. The amount of light required for lowering the potential of −700 V to −200 V was measured, and the found value was taken as sensitivity ($\mu J/cm^2$). The level of the obtained sensitivity was evaluated, based on the following criteria. In the present disclosure, it was determined that in ranks A and B, the initial sensitivity was sufficiently obtained, and that in rank C, the initial sensitivity was insufficient.

Rank A: 0.25 $\mu J/cm^2$ or higher and lower than 0.30 $\mu J/cm^2$, Rank B: 0.30 $\mu J/cm^2$ or higher and lower than 0.35 $\mu J/cm^2$, and Rank C: 0.35 $\mu J/cm^2$ or higher The results of the evaluation in this way are shown in Table 2.

Evaluation of Image Deletion

The image was evaluated according to the following method. Firstly, the total amount of discharge current in a charging step was set at 70 $\mu A$, and a cassette heater (drum heater) in the apparatus was turned off. After that, a test chart having an image ratio of 5% was used, and images of one hundred thousand sheets were continuously formed. After the image formation was finished, power supply to the copying machine was stopped, and the copying machine was left for 3 days. After the copying machine was left for three days, the power supply to the copying machine was started again, and the copying machine output a lattice image and a character image in which Japanese syllabary characters "iroha" were repeatedly written (iroha character image), onto an A4 landscape-size sheet.

The level of the image deletion on the obtained image on the whole A4 sheet was evaluated, based on the following criteria. In the present disclosure, it was determined that in ranks A and B, an effect of suppressing the image deletion was sufficiently obtained, and that in rank C, the effect of suppressing the image deletion was obtained. It was determined that in rank D, the effect of suppressing the image deletion was not obtained.

Rank A: image defects are not observed on both of the lattice image and the iroha character image.

Rank B: a part of the lattice image is foggy, and a part of the iroha character image becomes dilute.

Rank C: the lattice image is partially lost, and the iroha character image becomes dilute on the whole area.

Rank D: the lattice image is lost on the whole area, and the iroha character image becomes dilute on the whole area.

The results of the evaluation of the image deletion are shown in Table 2, which used the evaluation apparatuses 1 and 2 that will be described below.

[Evaluation Apparatus 1]

A copying machine image RUNNER (iR) (registered trademark)-ADVC5051 manufactured by Canon Inc. was modified into a machine (where a charging unit had a system in which such a voltage that AC voltage was superimposed on DC voltage was applied to a roller type of contact charging member (charging roller) which was brought into contact with an electrophotographic photosensitive member, and an exposure unit had a system of exposing an image to a laser (wavelength: 780 nm)): and the electrophotographic photosensitive members produced in Examples 1 to 28 and Comparative Examples 1 to 3 were each mounted on the modified machine and were each subjected to evaluations.

Specifically, the above evaluation apparatus was placed under an environment of high temperature and high humidity (30° C./85% RH); the produced electrophotographic photosensitive member was mounted on a process cartridge for a cyan color; the resulting process cartridge was mounted on a station for the cyan process cartridge; and the image deletion was evaluated.

[Evaluation Apparatus 2]

The copying machine image iR-ADVC5051 manufactured by Canon Inc. was modified into a machine (where a charging unit had a system in which DC voltage was applied to a roller type of contact charging member (charging roller), and an exposure unit had a system of exposing an image to the laser (wavelength: 780 nm)): and the electrophotographic photosensitive members produced in Examples 1 to 28 and Comparative Examples 1 to 3 were each mounted on the modified machine and were each subjected to evaluations.

Specifically, the above evaluation apparatus was placed under an environment of high temperature and high humidity (30° C./85% RH); the produced electrophotographic photosensitive member was mounted on a process cartridge for a cyan color; the resulting process cartridge was mounted on a station for the cyan process cartridge; and the image deletion was evaluated.

TABLE 2

| | Evaluation results | | | |
| --- | --- | --- | --- | --- |
| | Initial sensitivity | | Image deletion | |
| Example | 23° C. 50% RH | 30° C. 85% RH | Evaluation apparatus 1 | Evaluation apparatus 2 |
| Example 1 | A | A | A | A |
| Example 2 | A | A | A | A |
| Example 3 | A | A | A | A |
| Example 4 | A | A | A | A |
| Example 5 | A | A | A | A |
| Example 6 | A | A | A | A |
| Example 7 | A | A | A | A |
| Example 8 | A | A | A | B |
| Example 9 | A | A | A | A |
| Example 10 | A | A | A | A |
| Example 11 | A | B | A | A |
| Example 12 | A | B | A | A |
| Example 13 | B | B | B | B |
| Example 14 | B | B | B | B |
| Example 15 | B | B | B | B |
| Example 16 | B | B | B | B |
| Example 17 | B | B | B | B |
| Example 18 | B | C | C | B |
| Example 19 | B | B | B | B |
| Example 20 | B | B | B | B |
| Example 21 | B | B | B | B |
| Example 22 | B | B | B | C |
| Example 23 | B | C | B | B |
| Example 24 | C | C | C | C |
| Example 25 | C | C | B | B |
| Example 26 | C | C | B | B |
| Example 27 | C | C | C | C |
| Example 28 | C | C | C | C |
| Comparative Example 1 | B | B | D | D |
| Comparative Example 2 | B | B | D | D |
| Comparative Example 3 | B | B | D | D |

As is shown in Table 2, it is understood that the electrophotographic photosensitive members of the present disclosure and the process cartridges and the electrophotographic apparatuses using the respective electrophotographic photosensitive members of the present disclosure can provide satisfactory results for the suppression of the occurrence of the image deletion. It is understood when the surface layer does not contain the chemical compound represented by the Formula (1) as in Comparative Examples, the image deletion tends to occur, and accordingly the electrophotographic photosensitive members of Comparative Examples cannot achieve the object of the present disclosure.

As described above with reference to the embodiments and Examples, the present disclosure can provide an electrophotographic photosensitive member having a surface layer in which the occurrence of the image deletion is suppressed. In addition, the present disclosure can provide a process cartridge and an electrophotographic apparatus that have each the electrophotographic photosensitive member.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-110644, filed Jun. 13, 2019, which is hereby incorporated by reference herein in its entirety.

What is claimed is:

1. An electrophotographic photosensitive member, comprising;

an electro-conductive support, a photosensitive layer and a surface layer, in this order;

the surface layer comprising a copolymerized product of a composition comprising a polymerizable compound and a metal tin oxide particle having a polymerizable functional group on a surface thereof, wherein the polymerizable compound is represented by Formula (1)

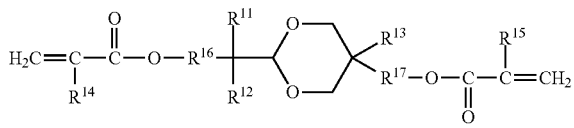

(1)

where $R^{11}$ and $R^{12}$ independently represent an alkyl group having 1 to 4 carbon atoms, or an aryl group that is optionally substituted with an alkyl group having 4 or less carbon atoms; $R^{11}$ and $R^{12}$ may combine with each other to form a ring; $R^{13}$ represents an alkyl group having 1 to 4 carbon atoms; $R^{14}$ and $R^{15}$ independently represent a hydrogen atom or a methyl group; and $R^{16}$ and $R^{17}$ independently represent an alkylene group laying 1 to 4 carbon atoms, and the composition satisfies $4 \leq M_\alpha/M_\beta \leq 45$ where $M_\alpha$ represents a mass content of the compound represented by Formula (1) and $M_\beta$ represents a mass content of the tin oxide particle having the polymerizable functional group on the surface thereof.

2. The electrophotographic photosensitive member according to claim 1, wherein the metal oxide particle is surface-treated with a surface treatment agent having a methacryloyl group or an acryloyl group.

3. The electrophotographic photosensitive member according to claim 1, wherein the photosensitive layer comprises a compound represented by Formula (3)

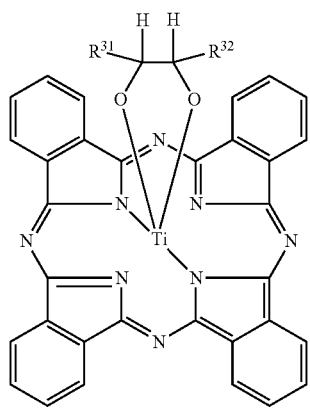

(3)

where wherein $R^{31}$ and $R^{32}$ independently represent hydrogen or an alkyl group having 2 or less carbon atoms, and a total number of carbon atoms of $R^-$ and $R^{32}$ is 2.

4. The electrophotographic photosensitive member according to claim 1, wherein the surface layer comprises a compound represented by Formula (4):

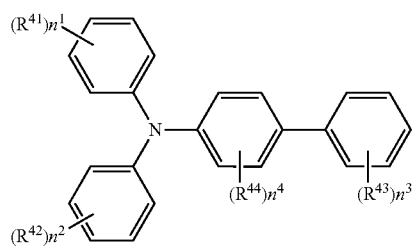

(4)

where $R^{41}$ to $R^{44}$ are independently a hydrogen atom, an alkyl group having 1 to 3 carbon atoms, or an alkoxy group having 1 to 3 carbon atoms, and $n^1$ to $n^3$ are independently an integer of 1 to 5, and $n^4$ is an integer of 1 to 4; and when $n^1$ to $n^4$ are 2 or larger, the plural groups may be the same or different.

5. The electrophotographic photosensitive member according to claim 1, wherein $R^{11}$ and $R^{12}$ are both methyl.

6. A process cartridge integrally supporting an electrophotographic photosensitive member and at least one unit selected from the group consisting of a charging unit, a developing unit and a cleaning unit, the process cartridge being detachably attachable to a main body of an electrophotographic apparatus;

the electrophotographic photosensitive member comprising an electro-conductive support, a photosensitive layer and a surface layer, in this order;

the surface layer comprising a copolymerized product of a composition comprising a polymerizable compound and a tin oxide particle having a polymerizable functional group on a surface thereof, wherein the polymerizable compound is represented by Formula (1)

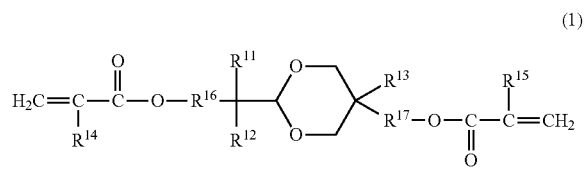

(1)

where $R^{11}$ and $R^{12}$ independently represent an alkyl group having 1 to 4 carbon atoms, or an aryl group that is optionally substituted with an alkyl group having 4 or less carbon atoms; $R^{11}$ and $R^{12}$ may combine with each other to form a ring; $R^{13}$ represents an alkyl group having 1 to 4 carbon atoms; $R^{14}$ and $R^{15}$ independently represent a hydrogen atom or a methyl group; and $R^{16}$ and $R^{17}$ independently represent an alkylene group having 1 to 4 carbon atoms, and the composition satisfies $4 \leq M_\alpha/M_\beta \leq 45$ where $M_\alpha$ represents a mass content of the compound represented by Formula (1) and $M_\beta$ represents a mass content of the tin oxide particle having the polymerizable functional group on the surface thereof.

7. An electrophotographic apparatus, comprising:

an electrophotographic photosensitive member having an electro conductive support, a photosensitive layer and a surface layer, in this order; and at least one unit selected from the group consisting of a charging unit, an exposure unit, a developing unit and a transfer unit:

the surface layer comprising a copolymerized product of a composition comprising a polymerizable compound and a tin oxide particle having a polymerizable functional group on a surface thereof, wherein the polymerizable compound is represented by Formula (1)

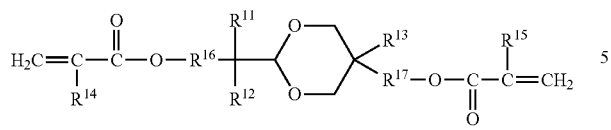

(1)

where $R^{11}$ and $R^{12}$ independently represent an alkyl group having 1 to 4 carbon atoms, or an aryl group that is optionally substituted with an alkyl group having 4 or less carbon atoms; $R^{11}$ and $R^{12}$ may combine with each other to form a ring; $R^{13}$ represents an alkyl group having 1 to 4 carbon atoms; $R^{14}$ and $R^{15}$ independently represent a hydrogen a om or a methyl group; and $R^{16}$ and $R^{17}$ independently represent an alkylene group having 1 to 4 carbon atoms, and the composition satisfies $4 \leq M_\alpha/M_\beta \leq 45$ where $M_\alpha$ represents a mass content of the compound represented by Formula (1) and represents a mass content of the tin oxide particle having the polymerizable functional group on the surface thereof.

* * * * *